(12) United States Patent
Murphy

(10) Patent No.: US 9,238,770 B2
(45) Date of Patent: Jan. 19, 2016

(54) LOW VISCOSITY SYNTHETIC CEMENT

(75) Inventor: Erin Murphy, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 676 days.

(21) Appl. No.: 13/434,262

(22) Filed: Mar. 29, 2012

(65) Prior Publication Data
US 2013/0261220 A1    Oct. 3, 2013

(51) Int. Cl.
| | | |
|---|---|---|
| C09K 8/00 | (2006.01) |
| C08G 61/02 | (2006.01) |
| C09K 8/44 | (2006.01) |
| C04B 26/04 | (2006.01) |
| C04B 26/06 | (2006.01) |

(52) U.S. Cl.
CPC . *C09K 8/44* (2013.01); *C04B 26/04* (2013.01); *C04B 26/06* (2013.01)

(58) Field of Classification Search
CPC .......................................................... C09K 8/44
USPC .......................................................... 523/130
See application file for complete search history.

(56) References Cited

U.S. PATENT DOCUMENTS

| | | | | |
|---|---|---|---|---|
| 4,816,503 | A * | 3/1989 | Cunningham et al. | 523/521 |
| 5,109,088 | A * | 4/1992 | Ohwada et al. | 526/273 |
| 5,382,290 | A | 1/1995 | Nahm et al. | |
| 5,464,060 | A | 11/1995 | Hale et al. | |
| 5,886,125 | A | 3/1999 | Huybrechts | |
| 6,082,456 | A | 7/2000 | Dahl-Jorgensen et al. | |
| 6,221,935 | B1 * | 4/2001 | Hashimoto et al. | 523/526 |
| 6,379,601 | B2 | 4/2002 | Bowe et al. | |
| 7,267,174 | B2 | 9/2007 | Gonsveld et al. | |
| 7,343,456 | B2 | 3/2008 | Rowlands | |
| 7,343,974 | B2 | 3/2008 | Cowan | |
| 7,696,133 | B2 | 4/2010 | Cowan | |
| 8,215,393 | B2 | 7/2012 | MacKay et al. | |
| 2011/0237468 | A1 | 9/2011 | Reichenbach-Klinke et al. | |

FOREIGN PATENT DOCUMENTS

WO    WO 2010069607 A1 *    6/2010    ............. C09K 8/508

OTHER PUBLICATIONS

Kraton, "Kraton(R) D1184 A Polymer", Mar. 31, 2014.*
MatWeb, "Kraton(R) D1122 (SB)n Branched Copolymer", http://www.matweb.com/search/datasheettext.aspx?matid=49071, accessed Jun. 6, 2014.*
International Search Report and The Written Opinion of the International Search Authority dated May 7, 2013.

* cited by examiner

*Primary Examiner* — David Karst
(74) *Attorney, Agent, or Firm* — Clements Bernard Intellectual Property; Michael A. Masse

(57) ABSTRACT

The present invention relates to a synthetic cement that comprises a low viscosity monofunctional monomer, a dicyclopentadienyl moiety having a pendant free radical reactive species, 1,3-butyleneglycol dimethacrylate, unsaturated styrenic block copolymer, and a peroxide curing agent. Additionally it may include weighting agents depending on the circumstances of the well, as is well known to those skilled in the art. Other additional components such as oil based mud, suspending agents, Portland cement, acrylates and methacrylates, retardant curing additives, and clays may optionally be incorporated into the synthetic cement. The synthetic cement is activated by heat, for example, and can be crafted to set within a certain time frame, for example in 4 hours, so that it pumpable for as long as need be, and then be set to seal the well in the manner desired.

17 Claims, 5 Drawing Sheets

LOW VISCOSITY SYNTHETIC CEMENT

FIELD OF THE INVENTION

The present invention relates to a synthetic cement with a good balance of properties, including compressive strength similar to Portland cement, average solution viscosity sufficient to allow pumping for up to 6 hours or more, compatibility with oil-based muds such that it has adequate set strength with 20 wt. % mud contamination, stability under a wide temperature range, lower modulus (than traditional Portland cement) such that it is less prone to fracturing under stress greater than 5%, and great control in determining the desired set time. The composition of the synthetic cement comprises mono-functional monomers such as vinyl ester, acrylate/methacrylate; difunctional monomers such as dicyclopentadienyl moieties having a free radical reactive species and/or 1,3-butylene glycol dimethacrylate; unsaturated styrenic block copolymer, and a free radical initiator.

BACKGROUND OF THE INVENTION

The general procedure of drilling an oil or gas well includes drilling a borehole using a drilling fluid. Subsequent to drilling the borehole, casing is run into the well, preparatory to placing cement slurry in the annulus between the outside of the casing and the borehole wall. In order to obtain a good cementing job, it is necessary to displace substantially all of the drilling fluid or mud in the annulus with cement. This necessity arises from the fact that undisplaced mud and filter cake become the source of unsuccessful cement jobs since drilling fluids and cements are usually incompatible. Thus, most water base muds will either cause instant setting of the cement or act as a retarder of the cement setting that can adversely affect the strength of the cement. On the other hand, most cement slurries will flocculate and thicken most water base muds. As the cement is pumped out of the bottom of the casing and up the annulus, it may form flow channels through blocking sections of flocculated drilling mud. In addition, undisplaced filter cake can prevent cement from bonding to the formation and becomes the source of the flow channels.

U.S. Pat. No. 5,382,290 to Shell Oil Co. teaches that one of the major objectives of a primary cementing is to obtain good zonal isolation in the annulus of the well. Effective zonal isolation is achieved by sealing the cement and borehole wall. The interface of the cement and borehole wall is usually an interface between the cement and drilling fluid filter cake which is the source of many cementing problems. Good zonal isolation can be achieved if the filter cake hardens, permanently bonds to the formation face and the cement, and provides hydraulic sealing.

U.S. Pat. No. 5,464,060 assigned to Shell Oil Co. discloses a composition for use in drilling and cementing a well, thus avoiding removal of the drilling fluid, since the composition can be employed for both functions. The "universal drilling fluid" comprises the product of a drilling mud admixed with a hydraulic material which is suitable for drilling a borehole and laying down a settable filter cake on the walls of said borehole; and an activator admixable with or contacting the filter cake, the activator being functional to cause the filter cake to harden and set up. A preferred way of applying the activator is to conduct a normal cement job with a cement or mud-concrete slurry which carries the activator. The activator may also be admixed with a mud, a spotting fluid, or a pill and the resulting fluid may be spotted or circulated through the annulus prior to cementing. The activator is subsequently filtered (diffused) through the filter cake and causes it to set hard.

The advantages realized by the Shell invention include the following: (1) a universal fluid is functionally and rheologically suitable as a drilling fluid; (2) the settable filter cake laid down by the universal fluid hardens to a relatively high compressive strength, for example, about 3,500 psi; (3) improved zonal isolation is achieved by the settable filter cake which bonds to the formation and the cementing medium; (4) the bond between the hardened filter cake and the cementing medium is very strong; and (5) it is not necessary either to displace mud or to remove the mud filter cake when a universal fluid is used as a drilling fluid in a well.

Achieving good solution viscosity is important because the drilling fluid must be stable under high temperature conditions—the deeper the well the hotter is the surrounding earth. Additionally important time constraints are desired, where it may take 4 to 6 hours to pump a drilling fluid into a very deep well bore, but then the drilling fluid must gel and thicken quickly. Contrarily, waiting 24 or more hours for Portland cement to gel is expensive and runs the risk that within the set time conditions may change in the well that presents additional obstacles to sealing a well.

U.S. Pat. No. 7,267,174 to Halliburton Energy Services achieves the time restraints by reducing the amount of cement employed. The amount of cement in the sealant compositions is reduced by an effective amount to lengthen the gel time of the sealant compositions to greater than or equal to about 4 hours when the composition is exposed to ambient temperatures in the wellbore. In an embodiment, the gel time is in a range of from about 4 hours to about 12 hours, alternatively, from about 4 to about 8 hours, alternatively, from about 4 to about 6 hours. In particular, the amount of cement present in the sealant compositions may be in a range of from about 0% to about 50% by weight of the sealant composition. Thus, cementless sealant compositions are contemplated in one embodiment. As used herein, gel time is defined as the period of time from initial mixing of the components in the sealant composition to the point when a gel is formed. Further, as used herein, a gel is defined as a crosslinked polymer network swollen in a liquid medium.

U.S. Pat. No. 6,082,456 to Wecem AS discloses sealing oil and gas wells with a composition containing monomers, an initiator for heat induced production of free radicals, and a pot life extending inhibitor for stabilizing free radicals. Acrylate monomers are employed with organic peroxides as an initiator. This composition is not a drilling fluid. It is a cement substitute.

U.S. Pat. Nos. 7,343,974 and 7,696,133 to Shell Oil co. disclose a composition comprising vinyl ester of a $C_9$ to $C_{11}$ Versatic™ acid, at least one di- or tri-functional acrylate or methacrylate monomer, peroxide initiator, and unsaturated styrenic block copolymer, namely Kraton™ D triblock copolymers. Weighting agents like barite (barium sulfate) are incorporated in the composition. This composition had exceeded the desired solution viscosity and the compression strength was too low, and therefore it was not a good candidate as a universal fluid.

Generally there is a trade-off between solution viscosity and compression strength. To obtain a solution viscosity that allows the fluid to be pumped for 4 to 6 hours, the solution viscosity should not exceed about 1000 cP at room temperature. Low solution viscosity not only requires less energy consumption, but it also prevents any damage to weak formations around the wellbore. However the higher the desired compression strength, the higher the solution viscosity. To obtain compression strengths similar to Portland cement, the solution viscosity was too high, until the present invention.

Accessing low margin, highly fractured, and other challenged reservoirs has become increasingly difficult using traditional cement materials. Synthetic cement that has a low solution viscosity, high compressive strength and mechanical properties, improved performance in the presence of hydrocarbon contamination, and which can be controllably set in a desired zone would allow greater access to such challenging wells.

There exists a need in the oilfield for materials with low rheological profiles (similar to a typical oil-based drilling fluid) that can be controllably set into a composite material with compressive strength comparable to traditional Portland-based cement. Additionally, it is well known that hydraulic cements do not perform well in the presence of oil based mud. A material that possesses improved retention of mechanical properties in the presence of at least 20 wt. % oil based mud contamination (i.e., at least about 400 psi compressive strength) would therefore be highly desirable, as it may eliminate the need for both hole clean-out prior to cementing the well as well as the use of spacer fluids. Another concern with traditional cement is its high modulus, which lends itself to fracturing when placed under a strain greater than ~5%; a semi-ductile synthetic cement material would therefore be able to withstand the effects of greater temperatures swings in the wellbore throughout the lifetime of the cement.

SUMMARY OF THE INVENTION

All ranges set forth in the specification and claims include not only the end point of the ranges, but also every conceivable number between the end point of the ranges since that is the very definition of a range.

The present invention is a material that has a similar rheological profile to a typical non-aqueous drilling fluid which can be controllably set at a range of desired bottom hole static temperatures (BHST) to create a composite that has strength comparable to or in excess of traditional cement; in addition, this material possesses better performance in the presence of oil-based contamination than does traditional hydraulic cement. The composition of this invention includes an unsaturated thermoplastic elastomer, such as styrene-butadiene-styrene (SBS), a low viscosity monofunctional monomer, such as vinyl ester, acrylate or methacrylate monomer, and di-functional monomer(s), such as dicyclopentadienyl methacrylate and/or butylene glycol dimethacrylate. The composition may further include an additive to initiate the polymerization and crosslinking of the components into a composite, a weighting agent, a sag reduction agent, a fluid loss agent, and/or other additives known in the art, or combinations thereof.

Key performance requirements include the viscosity of the material in the solution state, the ability to cure this material in a controllable manner with a quick transition from liquid to solid (right angle set), the compressive strength of the cured composite, and the ability to maintain those performance requirements in the presence of oil-based contamination.

The present invention relates to synthetic cement that comprises a low viscosity monofunctional monomer, a difunctional monomer, certain unsaturated styrenic block copolymer(s), and a free radical initiator. Additionally it may include weighting agents depending on the circumstances of the well, as is known to those skilled in the art. Other additional components such as oil based mud, suspending agents, Portland cement, acrylates and methacrylates, retardant curing additives, fluid loss additives, deflocculants, sag reduction agents, and clays may optionally be incorporated into the synthetic cement. It is desirable that the synthetic cement have a low solution viscosity such that it remains a liquid under a wide temperature range—0 to 250° C. The synthetic cement can be crafted to set within a certain time frame, for example in 4 hours, so that it is pumpable for as long as need be, and then be set to seal the well in the manner desired.

In particular, the low viscosity monofunctional monomer is present in an amount ranging from 10 to 80 wt. % of the synthetic cement. The difunctional monomer is a dicyclopentadienyl moiety and is in a range of 0 to 75 wt. % of the synthetic cement. When the difunctional monomer is 1,3 butylene glycol dimethacrylate (BGDM) or mixtures with a dicyclopentadienyl moiety it is in a range of 0 to 90 wt. % of the synthetic cement. The unsaturated styrenic block copolymer content is in the range of 5 to 45 wt. % of the synthetic cement, and the peroxide curing agent may be present in an amount ranging from 0.1 to 1 wt. % based on the total weight of the low viscosity monofunctional monomer, the difunctional monomer or mixture of monomers, and unsaturated styrenic block copolymer. The total weight of the synthetic cement is 100 wt. %. For the ranges set forth above, each range includes the beginning and ending number and each integral number in between, and the range of each component may be limited such that it includes any range within the limits of the beginning and ending number. This wide range for each component is necessary because well conditions vary in depth, temperature, pressure, geological strata, and it is possible that one well may encounter water, natural gas and oil bearing strata, or any combination thereof. To formulate synthetic cement for each well requires custom assembling of the components to obtain the required features.

The synthetic cement may have the following features: a solution viscosity of about 50 to about 1,000 cP at the end of the well bore or at pumping; a minimum compressive strength of 1000 psi when set; a thickening time of 25 to 400 minutes, preferably 50 to 360 minutes; and retention of mechanical properties in the presence of about 20 wt. % oil based mud.

In the broadest sense, the present invention relates to a universal fluid compatible with oil based mud for drilling and cementing wells, comprising:
  i) a low viscosity monofunctional monomer;
  ii) a difunctional monomer of a dicyclopentadienyl moiety having a pendant free radical reactive species of acrylate, methacrylate, vinyl, olefinic, allyl, or amide; and/or 1,3-butylene glycol dimethacrylate (BGDM);
  iii) an unsaturated styrenic block copolymer; and
  iv) a free radical initiator.

The preferred dicyclopentadienyl moiety is a dicyclopentadienyl methacrylate. The preferred low viscosity monofunctional monomer is vinyl ester, particularly VeoVa™ 10 vinyl ester available from Momentive Specialty Chemicals, Inc.

DESCRIPTION OF THE PREFERRED EMBODIMENTS

Figure 1:
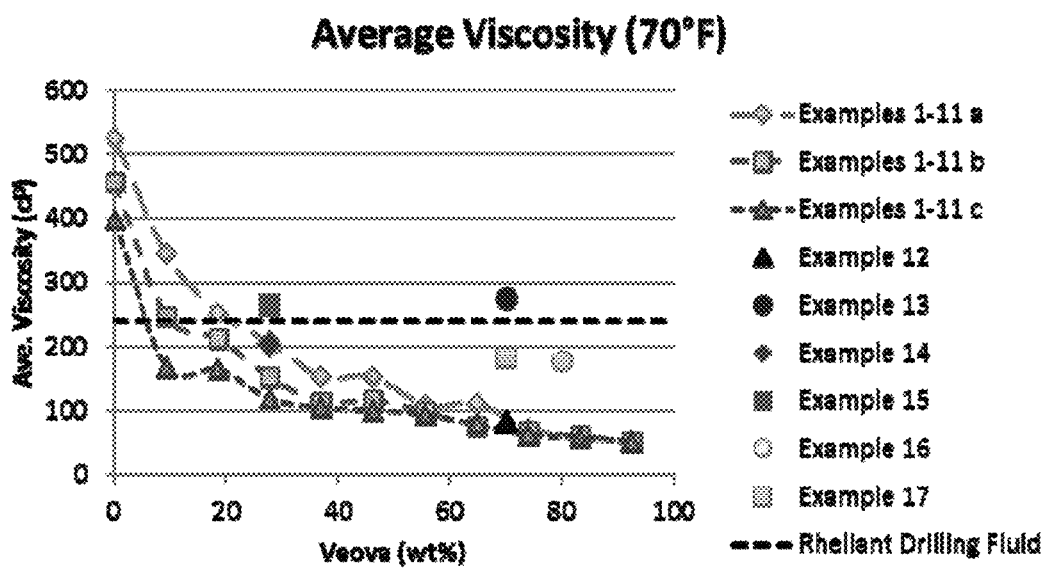
FIG. 1 is a graph of average viscosity in cP at 70° F. versus the amount of VeoVa 10 vinyl ester in wt. % for Examples 1-17. Also shown for reference is Rheliant drilling fluid at 14.5 # per gallon.

The present invention relates to synthetic cement with a good balance of properties, including compressive strength, solution viscosity, compatibility with oil-based muds, stability under a wide temperature range, and adhesion to steel. The compressive strength is similar to or greater than Portland cement under equivalent conditions. It has been proven that Portland cement has the strength to seal the casing in a well bore and, if a well consists of a pipe within a pipe, the cement is suitable to isolate one portion of a pipe from another portion, as is well known to one skilled in the art. Compressive strengths of greater than or equal to about 1000 psi are necessary. As a practical matter, compressive strengths above 30,000 psi are of no additional benefit and therefore the additional cost to obtain greater compressive strengths has no economic value. In addition, when synthetic cement is contaminated with up to 20 wt. % oil based mud, the compressive strength is at least about 400 psi. While no upper limit is outside the present invention, the trade-off exists between compressive strength and solution viscosity.

Solution viscosity is an important feature because it measures the pumpability of the fluid. A fluid that possesses a high viscosity is difficult to pump a mile below the surface. Also, high viscosity fluid can be detrimental to weak subterranean formations due to high pressure that may cause a blowout in the wellbore. Conversely good compressive strengths are generally achieved by high viscosity fluids. So there is a trade-off between these two characteristics. For deep wells, a solution viscosity between about 50 to about 1,000 cP enables the fluid to be pumped at a reasonable cost. Viscosity in centipoise is measured according to API RP10B-2, "Recommended Practice for Testing Well Cements", Section 12, "Determination of Rheological Properties and Gel Strength".

Compatibility with oil based muds is important because during setting of the synthetic cement, it is often the case that the fluid becomes mixed with drilling mud. Drilling mud carries the bits of earth, dirt and stone to the top of the casing. When the well depth has been met, the casing pipe is then introduced and cemented into position. It is important that the synthetic cement tolerate up to about 20 to 30 wt. % oil based mud and still achieve sufficient compression strengths when set. This permits cementing of the wellbore without having to first cleanout the drilling mud and subsequently treating the casing and rock surface with adhesion promoters. This potentially eliminates the need for a spacer fluid. Specifically, synthetic cement must still have good adhesion to the steel casing pipe so that the casing is locked in place within the well bore. The adhesion must be sufficient to seal any fluid, such as water strata, from traveling up the pipe outer surface.

It is well known that the deeper a well, the hotter the temperature at the end of the casing. Heat limits the ability of Portland cement to set properly and even when it does set hot, the compressive strength is weaker. Organic peroxides are one type of free radical initiator that cause the synthetic cement to set. It becomes more active as the temperature rises. It is important that the set not occur until the synthetic cement reaches the desired depth. The thickening time is a measure of time when the fluid viscosity has achieved a certain minimum value—70 Bearden Consistency units (Bc). Thus, the time when the fluid reaches 70 Bc is an important indicator. This time can be as little as 25 minutes or as long as 400 minutes or longer. It may be necessary to incorporate a curing retardant to slow down the curing time when the temperature is high and the well is deep. Commercially available scorch protected free radical scavengers can be employed to reduce the effects of heat on the scavenger by lowering the active oxygen content. Although longer thickening times can be created, most all wells are easily accessed within the pumping time range of 50 to 360 minutes.

Monofunctional monomers suitable with the present invention are vinyl esters, acrylates and methacrylates. Vinyl ester includes a reactive ester, or blend of esters, having at least one carbon-carbon double bond, preferably selected from a vinyl ester of a $C_9$ to $C_{12}$ versatic acid and a vinyl ester of a long chain fatty acid, or blends thereof. Suitable vinyl ester is VeoVa 10 vinyl ester which is a vinyl ester of versatic acid represented by the formula $C_{12}H_{22}O_2$ and is a saturated monocarboxylic acid with a branched structure. It has low viscosity and is hydrophobic. It is commercially available from Momentive Specialty Chemicals Inc. Other suitable vinyl esters are known from U.S. Pat. No. 5,886,125 to DuPont. Acrylates and methacrylates such as octyl-decyl acrylate ($C_{21}H_4OO_2$) are sold under the Sartomer brand, as well as other brands, and are also suitable monofunctional monomers.

The unsaturated styrenic block copolymer may be di-, tri-, quad-blocks of mono alkenyl arenes having 8 to 18 carbon atoms, and conjugated dienes having 4 to 12 carbon atoms. Examples of suitable mono alkenyl arenes are styrene, alpha methyl styrene, propyl styrene, butyl styrene, cyclohexyl styrene, and mixtures of 2 or more. Preferred is styrene. The conjugated diene can be selected from butadiene, isoprene, or mixtures thereof. The unsaturated styrenic block copolymer may be a triblock such as styrene-butadiene-styrene, styrene-isoprene-styrene, or mixtures thereof including styrene-isoprene/butadiene-styrene. Suitable diblocks such as styrene-butadiene, styrene-isoprene, or mixtures thereof, or suitable quadblocks of at least one mono alkenyl arene and at least one conjugated diene are also known. Diblock copolymers are generally unstable in high temperature environments. Therefore a mixture of diblock and multi-arm block copolymers is preferred. These block copolymers can be linear constructed by sequential polymerization of the blocks, or constructed by employing a coupling agent so that 2 or more arms of block copolymers are produced, such as $(S-B)_n$, wherein n equals 2 to 8 arms of the block copolymer S-B. Such block copolymers are commercially available from Kraton Polymers. Suitable unsaturated styrenic block copolymers include D1102, D1101, D1184, D1118, D1122, D1155, D1192, D0243, and DX220, but the invention is not limited by these. While all of these were satisfactory, D0243 had the best combination of solution viscosity, compressive strength and adhesive strength.

Suitable styrenic block copolymers useful in the present invention are not hydrogenated (unsaturated), have a weight average molecular weight of between 100,000 and 450,000; have a polystyrene content between 27 and 40%; a degree of branching between 2-4 with up to 80% di-block polymer; the vinyl content is at least 5 mol. %, and preferably between 5 and 65 mol. %, and most preferably between 8 and 58 mol. %; and the degree of coupling is up to 80%, preferably between 10 and 80%, and more preferably between 15 and 80%.

Difunctional monomers suitable for the present invention are dicyclopentadienyl moieties and/or 1,3-butylene glycol dimethacrylate ($C_{12}H_{18}O_4$) (hereafter "BGDM"). Suitable dicyclopentadienyl moieties include those with an attached free radical reactive species such as acrylate, methacrylate, and vinyl or allyl groups. The preferred pendant reactive group is methacrylate. Dicyclopentadienyl methacrylate is most preferred ($C_{14}H_{18}O_2$). Dicyclopentadienyl methacrylate (DCPD) and BGDM are obtained from Sartomer USA, LLC. Preferred is a mixture of DCPD and BGDM.

An initiator is useful in the application of the present invention. The use of initiators is known in the art and the invention is not intended to be limited to any particular type. Suitable free radical initiating systems may include, for example, but not be limited to azo compounds, alkyl or acyl peroxides or hydroperoxides, ketoperoxides, peroxy esters, peroxy carbonates, and peroxy ketals, or mixtures thereof. Such compounds vary with respect to activation temperature and half-life or, in other words, the temperature at which their reaction is initiated and becomes extensive. Examples of suitable alkyl peroxides, dialkyl peroxides, hydroperoxides, acyl peroxides, peroxy esters and peroxy ketals include, but are not limited to benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di (2,4-dichlorobenzoyl) peroxide, diisobutyl peroxide, t-butyl perbenzoate, and t-butyl peracetate, or mixtures thereof. The initiator may be employed in total amounts from about 0.001 to about 1.0 weight percent based upon the total weight of the low viscosity monofunctional monomer, the difunctional monomer, and the unsaturated styrenic block copolymer. Also, any of the initiators may include a scorch protection additive such as those sold under the Arkema brand to reduce temperature effects and allow for better control of the thickening time and compressive strength. Some peroxide initiators are set forth in Table 1, but this is not a complete list of available peroxide initiators or free radical initiators, generally.

TABLE 1

Organic Peroxide Initiators

| Trade Name | Family of Peroxide | CAS # (of peroxide component) |
|---|---|---|
| Luperox 231 | Peroxyketal | 6731-36-8 |
| Luperox 231XL40-SP | Peroxyketal | 6731-36-8 |
| Luperox 101 | Dialkyl Peroxide | 78-63-7 |
| Luperox EZD-SP2 | Dialkyl peroxide | 78-63-7 |
| Luperox DC40P-SP2 | Dicumyl peroxide | 80-43-3 |
| Vul-Cup 40KE | Dialkyl peroxide | 25155-25-3 |
| LuperoxF40P-SP2 | Dialkyl peroxide | 25155-25-3 |

Likewise an inhibitor may be required and the invention is not intended to be limited to any particular inhibitor. Those skilled in the art would recognize suitable inhibitors. Examples of suitable inhibitors for free radical polymerization reactions include, for example, benzoyl quinone, para-benzoquinone, tertiary butyl catechol, and the like, and mixtures thereof, which exhibit efficacy at elevated temperatures. Some inhibitors are not adequately effective at elevated temperatures. Additional examples of inhibitors include hydroquinones, such as, for example methyl hydroquinone and methyl ethyl hydroquinone. Polyols, polyhydroxy ethers, alcohols and bases are inhibitors for acid-catalyzed condensation reactions. The quantity of inhibitor is adapted to the reactive, polymerizable prepolymer and monomer components in question, including the desired pot life and curing time. In general the inhibitor is present in a quantity from about 0.02 to 2 weight parts. The preferred quantity results in the proper right angle exothermic process. In a right angle exothermic process the liquid quickly cures to a solid, at variable curing time, so that the synthetic cement composition can be adjusted and "dialed-in" for each well. Such a process give a right angle set as evidenced by a sharp upturn in a consistency versus time graph which approximates a 90° angle.

An initiator is preferably used, but an inhibitor is not always necessary. When the temperature in the well is elevated, say for example, higher than 150° C., the reaction may proceed too fast. At such high temperatures the inhibitor acts as a free radical scavenger and prevents the polymerization from proceeding too fast. Eventually the inhibitor may be used up and the free radical then initiates polymerization which is subsequently self-sustaining In some high temperature wells the inhibitor can only decrease the reactivity a limited amount. Where the inhibitor has limited effectiveness there may be a negative impact on the molecular weight of the synthetic cement in that it is lower than would be optimally desirable.

The low viscosity monofunctional monomer is in a range of 10 to 80 wt. % of the synthetic cement. The dicyclopentadienyl moiety content is in a range of 0 to 75 wt. % of the synthetic cement. Preferably the DCPD content is in a range of 6 to 60 wt. % of the synthetic cement, and more preferably between 6 and 50 wt. %. The BGDM is in a range of 0-90 wt. % of the synthetic cement. Preferably the BGDM content is in a range of 6 to 60 wt. % and more preferably between the range of 6 to 50 wt. %. Thus it may be stated that the difunctional monomer is present in a range of 6 to 60 wt. % of the synthetic cement. The unsaturated styrenic block copolymer is in the range of 5 to 45 wt. % of the synthetic cement, and the peroxide curing agent may be in a range from 0.1 to 1.0 wt. % based on the total wt. of the low viscosity monofunctional monomer, difunctional monomer and unsaturated styrenic block copolymer (these total 100 wt. %). For the ranges set forth above, each range includes the beginning and ending number and each number in between, and the range of each component maybe limited such that it includes any range within the limits of the beginning and ending number.

Other additives can be incorporated into the formulation including, but not limited to coupling agents, suspending agents, weighting agents, and lost circulation materials.

Weighting agents or high density additives may be added to the formulation. Suitable materials include, for example, galena, hematite, magnetite, iron oxides, ilmenite, barite, siderite, celestite, dolomite, calcite, manganese oxides, magnesium oxide, zinc oxide, zirconium oxides, spinels and the like. The preferred weighting agent is barite—barium sulfate. The quantity of such material added, if any, depends upon the desired density of the chemical treatment composition. Typically, weighting material is added to result in a synthetic cement density of up to about 19 pounds per gallon. Generally these high density additives have a specific gravity of from 2.6 to about 15.

EXAMPLES

Examples 1-11

Average Viscosity

Synthetic cement compositions each comprising:

1) 7.5 wt. % of a high diblock, high vinyl, styrene-butadiene-styrene block copolymer known as Kraton D0243 polymer, 2) 0 to 92.5 wt. % of a monofunctional monomer of vinyl ester (VeoVa™ 10 monomer), and 3) difunctional monomers, which are a blend of DCPD and BGDM of varying ratios.

These components total 100 wt. %. In addition, 0.2 wt. % peroxide (Luperox 231) is added as free radical initiator, based on the 100 wt. % of components 1-3. At 92.5 wt. % vinyl ester (Example 11), there is no difunctional monomer; and likewise at 0 wt. % vinyl ester (Example 1) there is no monofunctional monomer. Therefore Example 1 and 11 are not examples of the present invention. In Table 2, the various compositions of synthetic cement are set forth. Since the amount of vinyl ester varies, the remaining difunctional component must also vary. However, all (a) compositions are based on a weight ratio of 75:25 DCPD to BGDM blends; all (b) compositions are based on a weight ratio of 50:50 DCPD to BGDM blends; and all (c) compositions are based on a weight ratio of 25:75 DCPD to BGDM blends. Each composition was equalized to 12.5 lbs per gallon by addition of a weighting agent to avoid skewing the data. Barite ($BaSO_4$) was used as the weighting agent and is a typical weighting agent in the oilfield.

TABLE 2

| Example | | Monomer (92.5 wt %) | | | Polymer (7.5 wt. %) |
|---|---|---|---|---|---|
| | | wt. % VeoVa 10 | wt. % DCPD | wt. % BGDM | |
| 1 | a | 0.0 | 69.4 | 23.1 | Kraton D0243 polymer |
| | b | | 46.3 | 46.3 | |
| | c | | 23.1 | 69.4 | |
| 2 | a | 9.3 | 62.4 | 20.8 | |
| | b | | 41.6 | 41.6 | |
| | c | | 20.8 | 62.4 | |
| 3 | a | 18.5 | 55.5 | 18.5 | |
| | b | | 37.0 | 37.0 | |
| | c | | 18.5 | 55.5 | |
| 4 | a | 27.8 | 48.6 | 16.2 | |
| | b | | 32.4 | 32.4 | |
| | c | | 16.2 | 48.6 | |
| 5 | a | 37.0 | 41.6 | 13.9 | |
| | b | | 27.8 | 27.8 | |
| | c | | 13.9 | 41.6 | |
| 6 | a | 46.3 | 34.7 | 11.6 | |
| | b | | 23.1 | 23.1 | |
| | c | | 11.6 | 34.7 | |
| 7 | a | 55.5 | 27.8 | 9.3 | |
| | b | | 18.5 | 18.5 | |
| | c | | 9.3 | 27.8 | |
| 8 | a | 64.8 | 20.8 | 6.9 | |
| | b | | 13.9 | 13.9 | |
| | c | | 6.9 | 20.8 | |
| 9 | a | 74.0 | 13.9 | 4.6 | |
| | b | | 9.3 | 9.3 | |
| | c | | 4.6 | 13.9 | |
| 10 | a | 83.3 | 6.9 | 2.3 | |
| | b | | 4.6 | 4.6 | |
| | c | | 2.3 | 6.9 | |
| 11 | — | 92.5 | 0.0 | 0.0 | |

Examples 12-15 and Comparable Examples 16 and 17

Example 12 of the present invention as shown in Table 3 is a synthetic cement composition with a good balance of average viscosity at 70° F. and compressive strength. Example 12 employed 0.36 wt. % Luperox DC40P-SP2 as the peroxide free radical initiator.

TABLE 3

| Example 12 (12.5 lb/gal) | wt. % |
|---|---|
| Kraton D0243 polymer | 7.5 |
| VeoVa 10 monomer | 70 |
| DCPD Methacrylate (CD535) | 5 |
| BGDM (SR297) | 17.5 |

The composition of Example 13 as shown in Table 4 is similar to Example 12, except the vinyl ester monofunctional monomer has been replaced with another monofunctional monomer—octyl/decyl acrylate. It also has a good average solution viscosity.

TABLE 4

| Example 13 (12.5 lb/gal) | wt. % |
|---|---|
| Kraton D0243 polymer | 7.5 |
| Octyl/Decyl Acrylate (SR484) | 70 |
| DCPD Methacrylate (CD535) | 5 |
| BGDM (SR297) | 17.5 |

The composition of Example 14 as shown in Table 5 has no DCPD, and the amount of vinyl ester has been reduced, while the difunctional BGDM has been increased compared to Example 12. Example 14 employed 0.2 wt. % Luperox 231 peroxide. It has an average viscosity within the present invention.

TABLE 5

| Example 14 (12.5 lb/gal) | wt. % |
|---|---|
| Kraton D0243 polymer | 7.5 |
| VeoVa 10 monomer | 27.75 |
| BGDM (SR297) | 64.75 |

The composition of Example 15 as shown in Table 6 is nearly identical to Example 14, except the BGDM has been replaced with only DCPD. It also has an acceptable viscosity.

TABLE 6

| Example 15 (12.5 lb/gal) | wt. % |
|---|---|
| Kraton D0243 polymer | 7.5 |
| VeoVa 10 monomer | 27.75 |
| DCPD Methacrylate (CD535) | 64.75 |

The composition of Comparable Example 16 as shown in Table 7 is from U.S. Pat. No. 7,343,974, which was not tested. In this composition, a tri-functional monomer was employed and also 0.36 wt. % Luperox DC40P-SP2 as the free radical initiator.

TABLE 7

| Example 16 (12.5 lb/gal) (U.S. Pat. No. 7,343,974 #5) | wt. % |
|---|---|
| Kraton D1122 polymer | 10 |
| VeoVa 10 monomer | 80 |
| Trimethylolpropane trimethacrylate (SR350) | 10 |

The composition of Comparable Example 17 as shown in Table 8 is from U.S. Pat. No. 7,343,974, which was not tested. In this composition, both a monofunctional monomer and a difunctional monomer were employed, and also 0.36 wt. % Luperox DC40P-SP2 as the free radical initiator.

TABLE 8

| Example 17 (12.5 lb/gal) (U.S. Pat. No. 7,343,974 #6) | wt. % |
|---|---|
| Kraton D1122 polymer | 10 |
| VeoVa 10 monomer | 70 |
| Tripropyleneglycol diacrylate (SR306) | 15 |
| Ethylene glycol monobutyl ether | 5 |

The average viscosity as a function of wt. % monofunctional monomer for each of Examples 1-17 was plotted in FIG. 1 along with Rheliant Drilling Mud as the comparable indicator. Those formulations having an average solution viscosity below about 1000 cP at 70° F. were generally suitable for the present invention and for pumping into a wellbore. Best performance was achieved when the average viscosity of the composition was below 500 cP and even better when it was below 250 cP, especially for composition employed as a drilling mud.

Compressive Strength

The formulations of Examples 1-17, relative to average viscosity, were tested for compressive strength. A 14 lb/gal Gulf of Mexico (GOM) cement slurry (the comparative example, Table 9) had an average viscosity of 267 cP at 70° F. and a compressive strength of 2,000 psi when cured at 250° F. for 24 hours. Examples of the present invention had a compressive strength of at least 1000 psi. The best performing examples had a compressive strength greater than 2000 psi.

TABLE 9

| Gulf of Mexico Cement (14 ppg) | Concentration | |
|---|---|---|
| TXI Lightweight Cement | 100% | BWOC |
| Blending Additive | 0.27% | BWOC |
| Defoamer | 0.25% | BWOC |
| Fresh (Drill) Water | 6.11 | gal/sack |
| Salt | 23.0% | BWOW |
| Fluid Loss Additive | 0.20 | gps |
| Retarder | 0.05 | gps |

Figure 2:
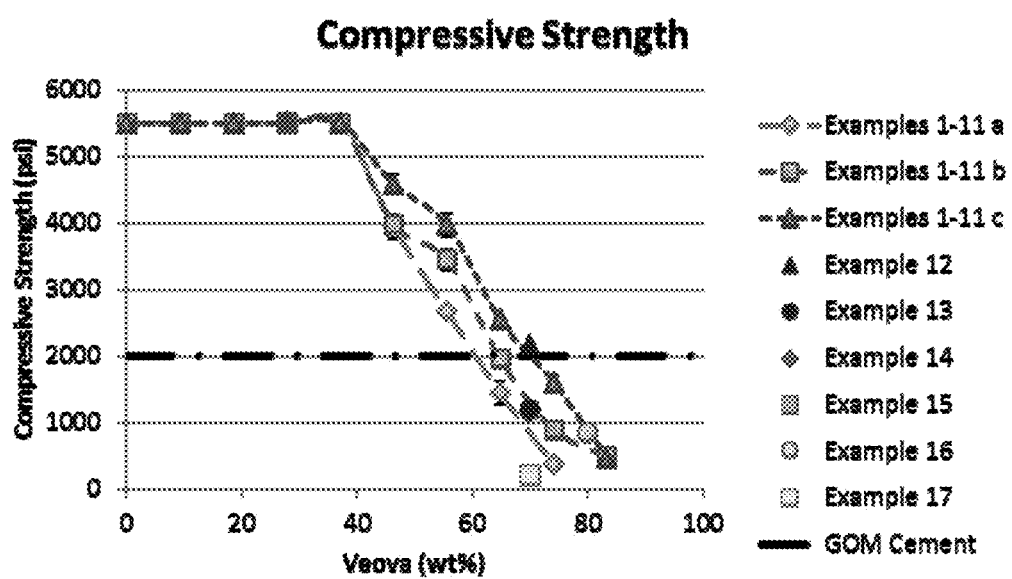
FIG. 2 is a graph of compressive strength in psi versus the amount of VeoVa 10 vinyl ester in wt. % for Examples 1-17 with a typical Gulf of Mexico (GOM) cement at 14 # per gallon, for reference.

The results are shown in Table 10 and FIG. 2. For Example 11: 1) all formulations with 60 wt. % or less of vinyl ester exceeded 2,000 psi compressive strength; 2) all samples with 40% or less vinyl ester had compressive strengths greater than 5,500 psi, the maximum measureable value; but 3) formulations over about 70 wt. % vinyl ester had unacceptably low compressive strength (less than 1000 psi). Note that in Example 13 the monofunctional monomer was ocyl/decyl acrylate demonstrating that monofunctional monomers other than vinyl ester yield suitable performance. Also, Examples 14 and 15 demonstrate that different difunctional monomers are suitable with the present invention. Both these examples had the same amount of vinyl ester—27.75 wt. % and like all other Examples with 40 wt. % or less vinyl ester, the compressive strength was greater than the 5,500 psi measurement maximum as evidenced by the flat graph area of FIG. 2. Comparative Examples 16 and 17 had unacceptably low compressive strength.

Viscosity Versus Compressive Strength

Figure 3:
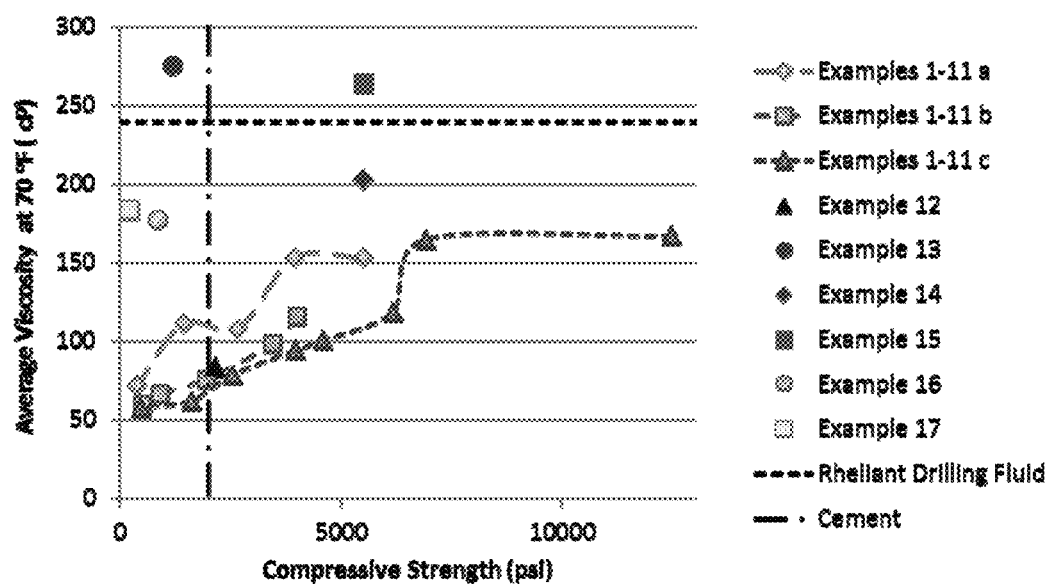
FIG. 3 is a graph of average viscosity in cP at 70° F. versus compressive strength in psi for Examples 1-17, with Rheliant drilling fluid and GOM cement, shown for reference.

In FIG. 3 the bold horizontal line at approximately 240 cP represents the average viscosity of an oil based drilling mud at 70° F.; the vertical line represents the compressive strength (approximately 2000 psi) of Gulf of Mexico cement. For the present invention, it is most preferred for the synthetic cement to have a solution viscosity of about 50 to 300 cP—near or below the horizontal line so the synthetic cement has the viscosity of a drilling mud. But for the present invention, the average solution viscosity can be equal to or less than about 1000 cP (but greater than or equal to 50 cP), while having a compressive strength equal to or greater than 1000 psi which is just to the left of the vertical line and higher—to the right of the vertical line. With the present invention many of the compositions have an average solution viscosity of lower than 300 cP and a compressive strength greater than 2000 psi. See Table 4. Young's Modulus measures the stiffness of the compositions in psi. Examples 16 and 17 show that Young's Modulus is too low—below about 800 psi. If the stiffness is too low, the composition will readily deform and is a poor sealant. If Young's Modulus is too high (over about 150,000 psi), the composition is too stiff, and will fracture with as little as a 5% deformation. Further indication that Comparative Examples 16 and 17 are unsuitable for the present invention is to note the hardness. Shore hardness OO is for soft compositions and Examples 16 and 17 have soft compositions when set. Medium hardness is tested with Shore A scale. Examples 12, 13 and 15 have such a hardness. The hardest compositions are measured on Shore D hardness. Example 14 meets this degree of hardness.

TABLE 10

| | Ex 12 | Ex 13 | Ex 14 | Ex 15 | Ex 16 | Ex 17 |
|---|---|---|---|---|---|---|
| Viscosity, Average at 70° F. (cP) | 93 | 275 | 202 | 264 | 236 | 236 |
| Compressive Strength (psi) | 2,150 ± 126 | 1,192 ± 120 | >5,500* | >5,500* | 668 ± 275 | 207 ± 61 |
| Young's Modulus (psi) | 2,065 ± 155 | 1,169 ± 132 | 15,124 ± 646 | 11,759 ± 664 | 194 ± 9 | 201 ± 19 |
| Hardness (Shore OO, A, or D) | 84.8 (A) ± 1.2 | 76.7 (A) ± 2.0 | 66.3 (D) ± 2.7 | 89.1 (A) ± 1.1 | 87.5 (OO) ± 2.3 | 81.7 (OO) ± 0.8 |

*Instrument maxed out at 5,500 psi during compression test.

The same compositions set forth in Examples 1-17 are shown on FIG. 3 wherein average viscosity is the y axis and compressive strength is the x axis. As shown therein, Comparative Examples 16 and 17 were not suitable because they have a compressive strengths of 668 and 207 psi, respectively.

Other styrenic based polymers are also suitable for the present invention. Block copolymers A-P are set forth in Table 11 below. Polymers A-P were substituted for the polymer employed in Example 12 (polymer F), with all other components employed in Example 12 remaining the same. Polymers A and B were hydrogenated SBS—otherwise known as SEBS. These types of polymers are known to have poor compressive strength (less than 1000 psi) and thus they are unacceptable for the present invention. Polymers L, M and N were unsuitable for the present invention because their average solution viscosities are too high. Additionally Polymer M had unacceptably high diblock content (100%), when the maximum is 80 wt. %. Polymers O and P, based on styrene-isoprene-styrene or styrene-isoprene/butadiene-styrene, respectively are suitable for the present invention.

Figure 4:
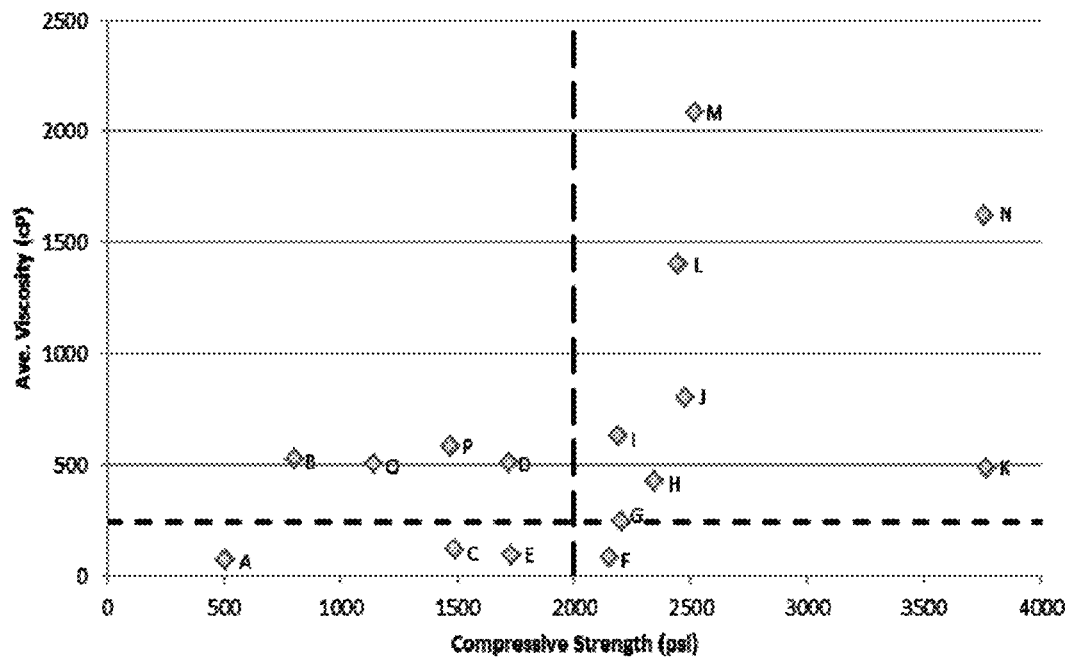
FIG. 4 is a graph of average viscosity in cP at 70° F. versus compressive strength in psi for samples prepared using the formulation in Example 12 with different polymers A-P, Rheliant drilling fluid and GOM cement.

The results shown in FIG. 4 demonstrate that suitable styrenic block copolymers useful in the present invention are not hydrogenated (unsaturated), have a weight average molecular weight of between 100,000 and 450,000, have a polystyrene content between 27 and 40%, a degree of branching between 2-4 with some weight percent di-block polymer, up to 80 wt. %; the vinyl content is at least 5 mol. %, and preferably between 5 and 65 mol. %, and most preferably between 8 and 58 mol. %; and the degree of coupling is up to 80%, preferably between 10 and 80%, and more preferably between 15 and 80%.

Resistance to Oil-Based Contamination

When the present invention is employed only as synthetic cement (not as a drilling mud), it is important that it be capable of sealing even if oil-based mud (OBM) contaminates some of the cement. Example 12 was compared against GOM cement under 0 wt. %, 10 wt. %, 20 wt. % and 30 wt. % OBM contamination. In each instance, the average viscosity, compressive strength, and adhesion to steel (adhesion to pipe) were tested. The results were reported in Table 12. Against

TABLE 11

| Polymer | Type | Structure | Styrene/Rubber Ratio | Molecular Weight (kg/mol) | Diblock (%) | Degree of Branching | Notes |
|---|---|---|---|---|---|---|---|
| A | SEBS | Diblock | 30/70 | 73 | 70 | 1.3 | |
| B | SEBS | Linear | 33/67 | 268 | <1 | 2.0 | High vinyl content |
| C | SBS | Diblock | 33/67 | 169 | 78 | 1.2 | |
| D | SBS | Radial | 34/66 | 438 | 18 | 3.5 | High vinyl content |
| E | SBS | Radial | 39/61 | 143 | 10 | 2.7 | |
| F | SBS | Diblock | 32/68 | 169 | 75 | 1.3 | High vinyl content |
| G | SBS | Linear | 31/69 | 173 | 17 | 1.8 | |
| H | SBS | Linear | 39/61 | 103 | <1 | 2.0 | |
| I | SBS | Radial | 31/69 | 415 | 16 | 3.5 | |
| J | SBS | Linear | 30/70 | 120 | 17 | 1.8 | |
| K | SBS | Linear | 31/69 | 150 | <1 | 1.9 | High vinyl content |
| L | SBS | Radial | 32/68 | 350 | 16 | 3.4 | |
| M | SBS | Diblock | 9/91 | 215 | 100 | 1.0 | |
| N | SBS | Radial | 23/77 | 330 | 16 | 3.4 | |
| O | SIS | Linear | 24/76 | 157 | 20 | 1.8 | |
| P | SIBS | Linear | 20/80 | 183 | 26 | 1.7 | |

The average viscosity and compressive strength for formulations comprising these polymers is shown in FIG. 4.

these results, the same tests were repeated for Comparative Examples 16 and 17 and those results are reported in Table 13.

TABLE 12

| Rheliant | Example 12 | | | | GOM Cement | | | |
|---|---|---|---|---|---|---|---|---|
| OBM (wt. %) | 0% | 10% | 20% | 30% | 0% | 10% | 20% | 30% |
| Viscosity, Average at 70° F. (cP) | 93 | 132 | 138 | 130 | 267 | 254 | 311 | 372 |
| Compressive Strength (psi) | 2150 ± 126 | 534 ± 0.5 | 428 ± 58 | 223 ± 28 | 1996 ± 91 | 413 ± 23 | 91 ± 4.5 | 46 ± 12 |
| Adhesive Strength (psi) | 222 ± 13 | 146 ± 10 | 120 ± 13 | 52 ± 9 | 223 ± 13 | 18 ± 2 | <5 | <5 |

TABLE 13

| | Examples 16 and 17 | | | | | | |
|---|---|---|---|---|---|---|---|
| Rheliant OBM (wt. %) | 0% | 10% | 20% | 30% | 0% | 10% | 20% |
| Viscosity, Average at 70° F. (cP) | 236 | 280 | 246 | 213 | 236 | 497 | 161 |
| Compressive Strength (psi) | 668 ± 275 | 513 ± 18 | 138 ± 114 | 33 ± 3.9 | 207 ± 61 | 222 ± 95 | 15 ± 1.2 |
| Adhesive Strength (psi) | 187 ± 17 | 134 ± 21 | 73 ± 12 | 36 ± 8 | 132 ± 6 | 68 ± 6 | 38 ± 4 |

In each instance, Example 12 had lower average viscosity than GOM cement and Comparative Examples 16 and 17, thus it was more easily pumpable (less energy is required to pump it). Likewise in all instances, Example 12 had higher compressive strengths than GOM cement and Comparative Examples 16 and 17. Thus, it functions better as cement. Lastly, in each instance, Example 12 has better adhesion to steel than GOM cement (note the adhesion was the same with no contamination) and Comparative Examples 16 and 17.

Controllable Cure

Figure 5:
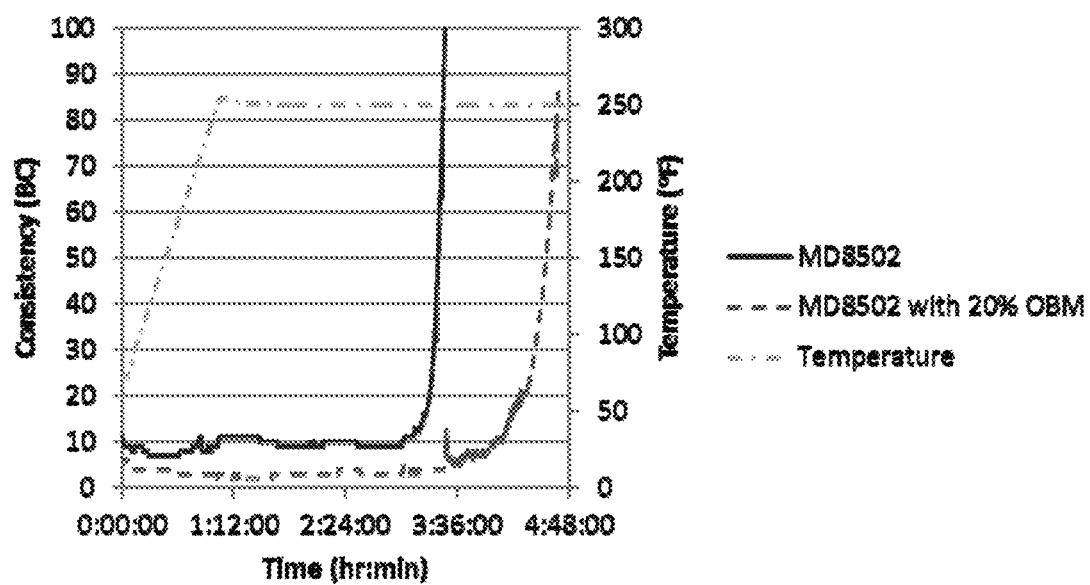
FIG. 5 is a graph of thickening time for Example 12 and Example 12 with 20 wt. % drilling mud contamination, as measured on a consistometer; the temperature and pressure were increased to 250° F. and 10,000 psi, respectively over a 60 minute ramp and then held constant for the remainder of the test.

Thickening Time:

The ability of cement slurries to transition from liquid to solid is measured on a consistometer; this equipment measures the solution consistency as a function of time, temperature, and pressure. The units for this test are Bearden Consistency (Bc) units; the scale is from 0-100 Bc. Cement is deemed "unpumpable" at 70 Bc (and higher); the time to reach 70 Bc is the reported thickening time. Also important is the shape of the curve; ideally, the consistency would sharply increase and demonstrate a right angle increase in the consistency versus time curve as the material sets up, indicating a rapid transition from a liquid state to a gelled/set state. Example 12 (see polymer F) comprised: 1) 7.5 wt. % of a high diblock, high vinyl, styrene-butadiene-styrene block copolymer (Kraton D0243), 2) 70 wt. % of VeoVa 10 monomer, a monofunctional monomer of vinyl ester, and 3) difunctional monomers, which were a blend of DCPD (5 wt. %) and BGDM (17.5 wt. %) giving a 22:78 wt. ratio DCPD:BGDM. These components total 100 wt. %. Based on this weight, 0.36 wt. % of initiator—Luperox DC40P-SP2 was employed to obtain a set in 3 hours, 25 minutes. FIG. 5 shows the results of the test run on the consistometer demonstrating a right angle set. Note that the consistometer reached a maximum and was turned off when a consistency of 20,000 psi (corresponding to 100 Bc) was achieved. Although not shown, generally any desired set time can be achieved by employing more or less amounts of the peroxide initiator.

Thus it is apparent that there has been provided, in accordance with the invention, a universal fluid composition that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

What is claimed is:

1. A synthetic cement compatible with oil based mud for cementing wells, comprising:
    i) a vinyl ester, an acrylate, or methacrylate monomer;
    ii) a dicyclopentadienyl moiety having an attached moiety susceptible to free radical reaction including acrylate, methacrylate, vinyl, olefinic, allyl, or amide;
    iii) an unsaturated styrenic block copolymer; and
    iv) a free radical initiator.

2. The synthetic cement of claim 1, having an initial average solution viscosity of 50 to less than about 1000 cP at 70° F., a compressive strength of ≥1000 psi, a right angle set time of 25 to 400 minutes, and a compressive strength of at least about 400 psi in the presence of at least 20 wt % oil based mud.

3. The synthetic cement of claim 1, wherein the Young's Modulus is between 800 and 20,000 psi.

4. The synthetic cement of claim 1, wherein the dicyclopentadienyl moiety contains an acrylate, methacrylate, vinyl or allyl pendant reactive species.

5. The synthetic cement of claim 4, wherein the dicyclopentadienyl moiety is dicyclopentadienyl methacrylate ($C_{14}H_{18}O_2$).

6. The synthetic cement of claim 5, wherein said dicyclopentadienyl methacrylate is present in a range of about 10 to about 80 wt. %.

7. The synthetic cement of claim 1, wherein said vinyl ester is a derivative of versatic acid with 9-12 carbon atoms.

8. The synthetic cement of claim 1, wherein said vinyl ester is represented by the formula $C_{11}H_{20}O_2$ or $C_{12}H_{22}O_2$.

9. The synthetic cement of claim 1, wherein said unsaturated styrenic block copolymer has a total average molecular weight of 100,000 to 450,000; a polystyrene content of 27-40 wt. %, a degree of branching of 2-4; up to 80 wt. % diblock content; at least 5 mol % vinyl content; and coupling up to 80%.

10. The synthetic cement of claim 1, wherein said unsaturated styrenic block copolymer is a linear styrene-butadiene-styrene.

11. The synthetic cement of claim 10, wherein said unsaturated styrenic block copolymer is in a range of 5 to 45 wt. % of the synthetic cement.

12. The synthetic cement of claim 1, wherein said unsaturated styrenic block copolymer is styrene- butadiene- styrene, with a polystyrene content of 27 to 40 wt. %.

13. The synthetic cement of claim 1, further including a weighting agent.

14. The synthetic cement of claim 13, wherein said weighting agent is employed in an amount such that said fluid and said weighting agent range from about 8 to about 20 lb/gal.

15. The synthetic cement of claim 1, wherein said vinyl ester, an acrylate, or methacrylate monomer is present in a range of 10 to 80 wt. %.

16. The synthetic cement of claim 1, wherein said free radical initiator is selected from a linear aliphatic organic peroxide, bisperoxy benzene peroxide, or dicumyl organic peroxide.

17. The synthetic cement of claim 16, wherein said free radical initiator is in the range of 0.1 to 1.0 wt. % of i+ii+iii.

\* \* \* \* \*